United States Patent [19]
Kim et al.

[11] Patent Number: 6,111,621
[45] Date of Patent: Aug. 29, 2000

[54] FLAT PANEL DISPLAY DEVICES HAVING IMPROVED SIGNAL LINE REPAIR CAPABILITY

[75] Inventors: Dong-Gyu Kim; Kyung-Seop Kim; Woon-Yong Park; Byoung-Sun Na, all of Kyungki-do, Rep. of Korea

[73] Assignee: Samsung Electronics Co., Ltd., Rep. of Korea

[21] Appl. No.: 09/053,440

[22] Filed: Apr. 1, 1998

[30] Foreign Application Priority Data

Apr. 3, 1997 [KR] Rep. of Korea .................. 97-12406

[51] Int. Cl.$^7$ ........................... G02F 1/1333; G02F 1/13
[52] U.S. Cl. .............................. 349/54; 349/40; 349/192
[58] Field of Search ...................... 349/40, 54, 55, 349/92, 122, 139, 192; 257/59, 72; 345/92, 93

[56] References Cited

U.S. PATENT DOCUMENTS

| | | | |
|---|---|---|---|
| 4,807,973 | 2/1989 | Kawasaki | 350/332 |
| 5,202,778 | 4/1993 | Niki | 359/54 |
| 5,260,818 | 11/1993 | Wu | 359/59 |
| 5,598,283 | 1/1997 | Fujii et al. | 349/143 |
| 5,684,547 | 11/1997 | Park et al. | 349/54 |
| 5,712,493 | 1/1998 | Mori et al. | 257/59 |
| 5,729,309 | 3/1998 | Na et al. | 349/54 |
| 5,767,929 | 6/1998 | Yachi et al. | 349/40 |
| 5,959,713 | 9/1999 | Kobayashi | 349/192 |
| 5,969,779 | 10/1999 | Kim et al. | 349/54 |
| 6,014,191 | 1/2000 | Kim et al. | 349/54 |
| 6,025,891 | 2/2000 | Kim | 349/40 |

FOREIGN PATENT DOCUMENTS 6-294975 10/1994 Japan .

Primary Examiner—William L. Sikes
Assistant Examiner—Tarifur R. Chowdhury
Attorney, Agent, or Firm—Myers Bigel Sibley & Sajovec

[57] ABSTRACT

Flat panel display devices having improved signal line repair capability utilize repair lines which have reduced parasitic capacitance with other active signal lines when connected to provide a repair function. This reduced parasitic capacitance is a result of a reduced number of overlaps between active signal lines (or other repair lines) and each repair line performing a repair function. A main repair line is provided on a display substrate to provide a repair function in the event one of the signal lines is defective. If a repair function is needed because a data line is defective (e.g., "opened"), this main repair line is electrically connected to a first end of the defective data line and indirectly electrically connected to a second end of the defective data line. The indirect electrical connection is provided by a sub-repair line, which can be electrically connected (i.e., "shorted") to the main repair line, and a data line extension which is electrically connected to a second end of the defective data line and the sub-repair line. To further reduce parasitic capacitance caused by overlaps between wiring patterns, the main repair line and data line extension are provided at a first wiring level and the data line and sub-repair line are provided at a second wiring level.

24 Claims, 6 Drawing Sheets

FLAT PANEL DISPLAY DEVICES HAVING IMPROVED SIGNAL LINE REPAIR CAPABILITY

FIELD OF THE INVENTION

The present invention relates to display devices and more particularly, to flat panel display devices.

BACKGROUND OF THE INVENTION

At present, the dominant methods for fabricating liquid crystal display devices (LCDs) and other flat panel display devices are the methods based on amorphous silicon (a-Si) thin-film transistor (TFT) technologies. Using these technologies, high quality image displays of substantial size can be fabricated using low temperature processes. As will be understood by those skilled in the art, conventional LCD devices typically include a transparent (e.g., glass) substrate with an array of thin film transistors thereon, pixel electrodes, orthogonal gate and data lines, a color filter substrate and liquid crystal material between the transparent substrate and color filter substrate. Other flat panel display devices include plasma display panels (PDPs), electroluminescent displays (ELDs) and field emission displays (FEDs). Many of these flat panel display devices have matrix type wiring structures which include a plurality of gate lines extending in one direction across a display substrate and a plurality of data lines extending in another orthogonal direction across the display substrate. However, because defects in these matrix type wiring structures can cause an entire column(s) or row(s) of display pixels to become inactive in response to gate line and data line driving signals, techniques to provide built-in repair capability have been provided.

One such technique to provide built-in repair capability is disclosed in U.S. Pat. No. 5,729,253 to Na et al. entitled "Liquid Crystal Display Substrate Having Repair Lines, assigned to the present assignee, the disclosure of which is hereby incorporated herein by reference. Another technique is disclosed by FIG. 1. In FIG. 1, a display substrate 1 is provided which has an active display area "A" therein. Gate line pads 7 and data line pads 9 are also provided on the substrate 1 and these pads are provided outside the display area "A". Each of these gate line pads 7 has a gate line 3 coupled thereto and each of the data line pads 9 has a data line 5 coupled thereto. A main repair line 11 which extends around the periphery of the active display area "A" is also formed on the substrate 1 to provide a repair function, if necessary. For example, in the event a break (illustrated by "≈") is formed in one of the data lines 5, respective connections (illustrated by "Δ") can be made to the main repair line to remedy the break by coupling both ends of the defective data line 5 to the respective data line pad 9 via the main repair line. As will be understood by those skilled in the art, a portion of the main repair line 11 is also disconnected (illustrated by "x") to reduce parasitic capacitance and RC delay associated with the repaired data line.

Referring now to FIG. 2, another conventional technique for providing built-in repair is illustrated. Here, a display substrate is provided having a central active display area "A" and a peripheral area "B". Data lines 5 and gate lines 3 extend across the display area "A", as illustrated. Data line pads 9 and gate line pads 7 are also provided in the peripheral area "B". A source PCB substrate 21 and gate PCB substrate 23 are provided and a main repair line 11 is provided. This main repair line 11 extends across the peripheral area "B", the gate PCB substrate 23 and the source PCB substrate 21. As illustrated, the main repair line has first portions 14, second portions 18 and third portions 16. Each of these first, second and third portions is capable of providing a repair function to a respective block of data lines 5. For example, first portions 14 can be connected (shown by the connection "Δ") to a defective data line in a respective block. U.S. application Ser. No. 08/708,224, filed Sep. 6, 1996, entitled "Liquid Crystal Display Having A Repair Line", assigned to the present assignee, the disclosure of which is hereby incorporated herein by reference, also discloses prior art display devices having built-in repair capability.

Unfortunately, both the device of FIG. 1 and the device of FIG. 2 may incur large RC delay and parasitic capacitance penalties when the repair function is provided. For example, with respect to the device of FIG. 1, if the number of data lines is 3072 and the $1536^{th}$ data line is open, the parasitic capacitance associated with the repaired data line will be 3072C, where "C" represents the capacitance associated with an overlap between the main repair line 11 and a data line 5. With respect to the device of FIG. 2, a large number of data blocks may be provided to reduce RC delay and parasitic capacitance, however, the use of a large number of blocks will unfortunately require the use of larger PCB substrates 21 and 23 to support the large number of main repair line portions.

Thus, notwithstanding these above described techniques at providing built-in repair capability for display devices, there continues to be a need for improved display devices having built-in repair capability that can be highly integrated, have improved RC delay and have reduced parasitic capacitance.

SUMMARY OF THE INVENTION

It is therefore an object of the present invention to provide flat panel display devices having built-in signal line repair capability.

It is another object of the present invention to provide flat panel display devices having signal lines therein which can be repaired with reduced parasitic capacitance penalty.

It is still a further object of the present invention to provide flat panel display devices having limited degrees of overlap between repair lines and active signal lines therein so that parasitic capacitance and RC delays can be reduced when repair functions are required.

These and other objects, features and advantages of the present invention are provided by flat panel display devices which have improved signal line repair capability. In particular, repair lines are preferably provided on a flat panel display substrate and these repair lines have reduced parasitic capacitance with other active signal lines when connected to provide a repair function. This reduced parasitic capacitance is a result of a reduced number of overlaps between active signal lines (or other repair lines) and each repair line performing a repair function.

According to an embodiment of the present invention, a thin-film transistor (TFT) liquid crystal display (LCD) device is provided having a lower display substrate with an active display area therein provided by an array of TFT pixels. These TFT pixels are controlled by and receive data from a plurality of gate lines and a plurality of data lines, respectively. These gate and data lines extend across the active display area and are patterned to extend in orthogonal directions on different wiring layers. At least a first main repair line is also provided on the lower display substrate to provide a repair function in the event one of the data lines is defective, for example. This first main repair line preferably extends along first and second opposing sides of the substrate and also extends opposite the data lines at a location adjacent the first side. If a repair function is needed because a data line is defective (e.g., "opened"), this first main repair line is electrically connected to a first end of the defective data line and indirectly connected to a second end of the defective data line.

According to a preferred aspect of the present invention, a first sub-repair line is provided at a location extending adjacent the second side of the substrate so that when the repair function is needed, this first sub-repair line can be electrically connected (i.e., "shorted") to the first main repair line. However, because an electrical connection between the first sub-repair line and a second end of the defective data line is still required, a data line extension is provided and this extension can be electrically connected between the first sub-repair line and the second end of the defective data line. Accordingly, the repair function is provided by a main repair line, a selected sub-repair line and a selected data line extension. The main repair line and data line extension are preferably formed at the same wiring level as the gate lines and the sub-repair line is preferably formed at the same wiring level as the data lines. A plurality of sub-repair lines are also preferably provided for each main repair line and each of these sub-repair lines is formed to provide a repair function to a respective block of data lines. To expand the signal line repair capability, a plurality of main repair lines are provided and each main repair line is associated with a respective plurality of sub-repair lines. Respective data line extensions (which provide an electrical connection to a second end of a defective data line) are also provide for each sub-repair line so that even numbered data lines in a block thereof may be connected to one sub-repair line and odd numbered data lines in the same block may be connected to another sub-repair line, for example. According to another aspect of the present invention, respective data line extensions may be provided so that data lines coupled to first color pixels in a block thereof may be coupled to a first color sub-repair line and data lines coupled to second color pixels in a block thereof may be coupled to a second color sub-repair line.

DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 3:
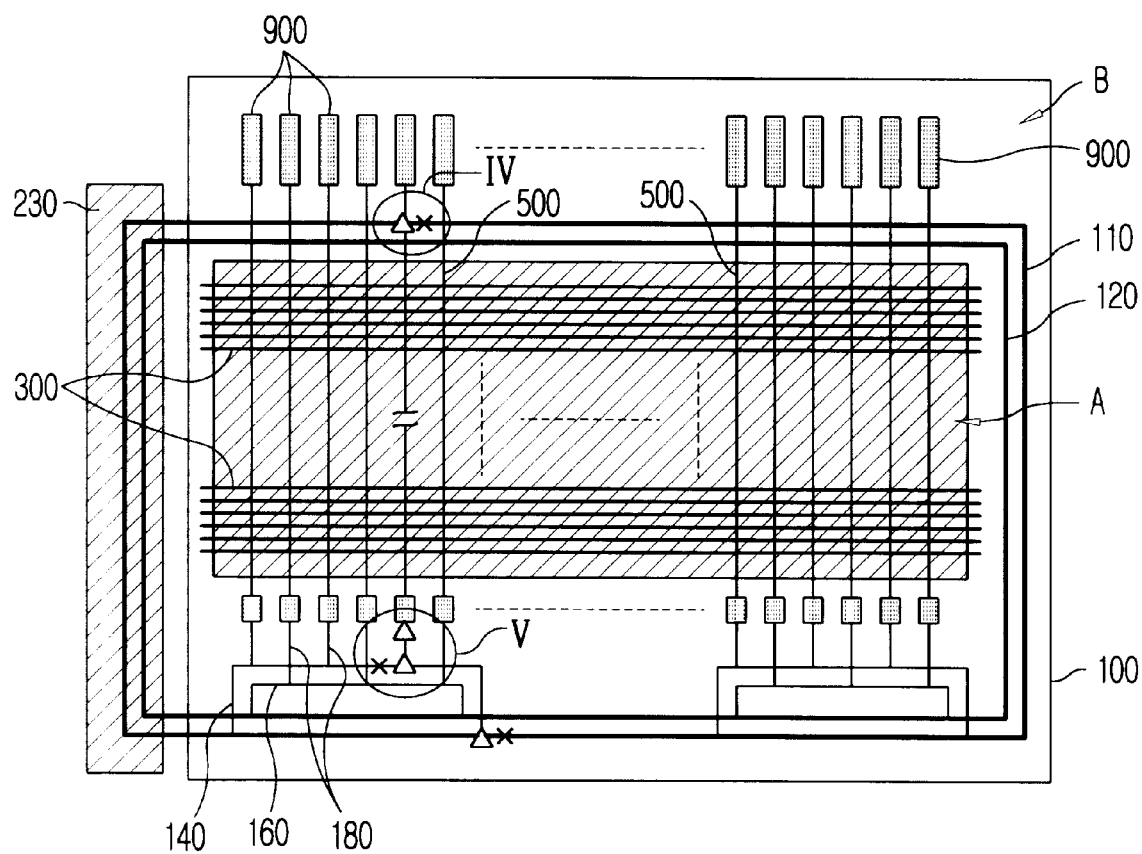
FIG. 3 is a plan layout view of a flat panel display according to a first embodiment of the present invention.

Referring now to FIG. 3, a flat panel display according to a first embodiment of the present invention will be described. In this embodiment as described more fully hereinbelow, even and odd main repair lines are provided and these repair lines perform repair functions (with reduced parasitic capacitance and RC delay) when respective even and odd data lines are defective. The preferred display includes a substrate 100 having an active display area (A) defined by an array of thin-film transistor (TFT) pixels, for example, and a pad region (B) having a plurality (e.g., 3072) of data pads 900 thereon. This substrate 100 may be the lower panel of a two panel display. A gate PCB substrate 230 is also electrically coupled to the display substrate 100. This gate PCB substrate may provide gate line driving signals to the gate lines 300 on the display substrate 100. As illustrated, these gate lines 300 may extend across the active display area. As will be understood by those skilled in the art, each gate line 300 may be electrically connected to the gate electrodes of a respective row of TFT pixels. The gate lines 300 may be formed at a first wiring level by patterning a first layer of metallization or layer of silicided polycrystalline silicon, for example. A plurality of data lines 500 also extend across the active display area at a second wiring level which is insulated from the first wiring level. These data lines 500 extend from a first side (e.g., top) of the display substrate 100 towards a second opposing side (e.g., bottom) in a direction orthogonal to the gate lines 300. First ends of each of the plurality of data lines are electrically connected to a respective data pad 900, as illustrated. According to one aspect of the present invention, there may be 768 gate lines 300 and 3072 data pads 900 and data lines 500 in a TFT LCD XGA-mode display. The 3072 data lines may be grouped as nine (9) blocks of 309 data lines and one (1) block of 291 data lines.

According to a preferred aspect of this embodiment, preferred signal line repair capability is provided by a plurality of main repair lines, a plurality of sub-repair lines and a plurality of signal line (e.g., data line) extensions. These main repair lines are illustrated in FIG. 3 as an odd main repair line 110 and an even main repair line 120. Although the even and odd main repair lines may be provided entirely on the substrate 100, it may be preferable to have portions of the main repair lines formed on the gate PCB substrate 230 (as illustrated) in order to reduce line resistivity, for example. The sub-repair lines 140 and 160 are illustrated in FIG. 3 as a plurality of odd sub-repair lines 140 and a plurality of even sub-repair lines 160. The number of sub-repair lines in each plurality may be a function of the number of desired blocks of data lines 500 which can be repaired. Each of these sub-repair lines overlaps (or underlies) a respective main repair line. As illustrated, the odd sub-repair line 140 also overlaps the even main repair line 120.

In the embodiment of FIG. 3, even and odd data line extensions 180 are also provided. Each of these data line extensions 180 overlaps (or underlies) a respective data line 500 and a respective sub-repair line so that connections can be made to these lines using laser fusing techniques. For example, if the data line extensions 180 are formed at the first wiring level (with the gate lines 300) and the data lines 500 and sub-repair lines 140 and 160 are formed at the second wiring level (above the first wiring level when the substrate 100 is viewed in transverse cross-section), then each of the data line extensions 180 will underlie a respective data line 500 and a respective sub-repair line. However, if the data line extensions 180 are formed at a third wiring level and the data lines 500 and sub-repair lines 140 and 160 are formed at the second wiring level (below the third wiring level when the substrate 100 is viewed in transverse cross-section), then each of the data line extensions 180 will overlap a respective data line 500 and a respective sub-repair line. Here, the third wiring level may be provided as a wiring level comprising indium—tin—oxide (ITO), which is also used to form pixel electrodes in the active portion of the display. These aspects of the present invention are best illustrated by highlighted regions IV and V which are reproduced as enlarged views in FIGS. 4 and 5.

Figure 4:
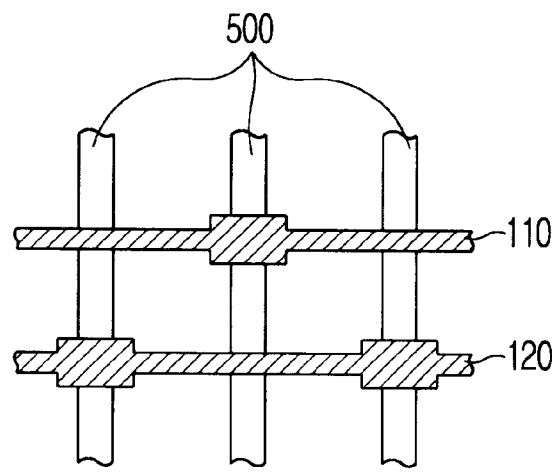
FIG. 4 is an enlarged plan layout view of region IV in FIG. 3, which illustrates a plurality of data lines which underlie a pair of main repair lines.
Figure 5:
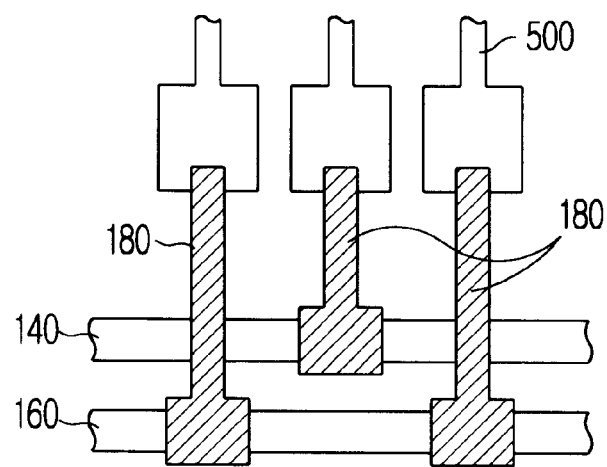
FIG. 5 is an enlarged plan layout view of region V in FIG. 3, which illustrates a plurality of data line extensions which underlie respective data lines and sub-repair lines.

Thus, in FIG. 4, a plurality of data lines 500 are illustrated as underlying (or overlapping) odd and even main repair lines 110 and 120. The lines may have regions therein which are widened (as illustrated) to facilitate formation of an electrical connection (i.e., "short") between the different wiring levels using laser fusing techniques well known to those skilled in the art. In FIG. 5, a plurality of data lines 500 are illustrated as underlying (or overlapping) a respective plurality of data line extensions 180. The sub-repair lines 140 and 160 also underlie (or overlap) the data line extensions 180.

Referring again to FIGS. 3–5, a method of repairing a defective data line 500 (illustrated as the data line with the break "≈") will be described. In particular, upon detection of the break by a test apparatus, a corresponding main repair line (e.g., the odd main repair line 110) is connected to a first end of the defective data line 500 (as illustrated by the "Δ") and to a respective one of the odd sub-repair lines 140, using conventional techniques. The corresponding odd data line extension 180 is also connected to a second end of the defective data line 500 and the corresponding odd sub-repair line 140 to complete the repair. Moreover, to reduce parasitic capacitance, a pair of breaks are formed in the odd main repair line 110 and a single break is formed in the odd sub-repair line 140. These breaks are illustrated by the mark "x". The location of these breaks is chosen to minimize the parasitic capacitance and the RC delay associated with the repaired data line. For example, if the defective data line 500 is located on the left side of the substrate 100, than the longer portion of the main repair line extending around the right side of the substrate 100 will be disconnected.

Figure 6:
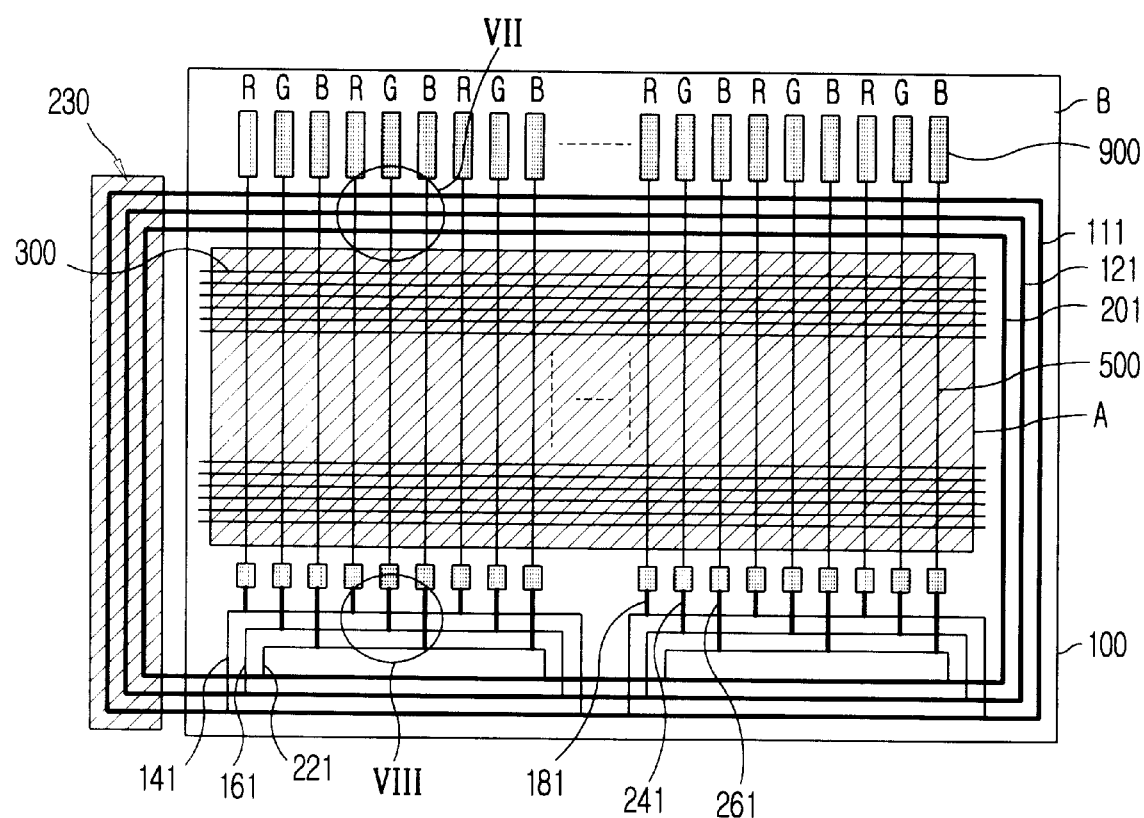
FIG. 6 is a plan layout view of a flat panel color display according to a second embodiment of the present invention.
Figure 7:
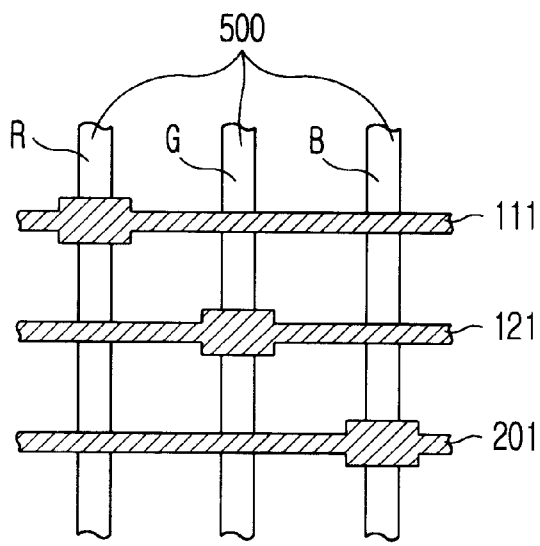
FIG. 7 is an enlarged plan layout view of region VII in FIG. 6, which illustrates a plurality of data lines which underlie a plurality of main repair lines.
Figure 8:
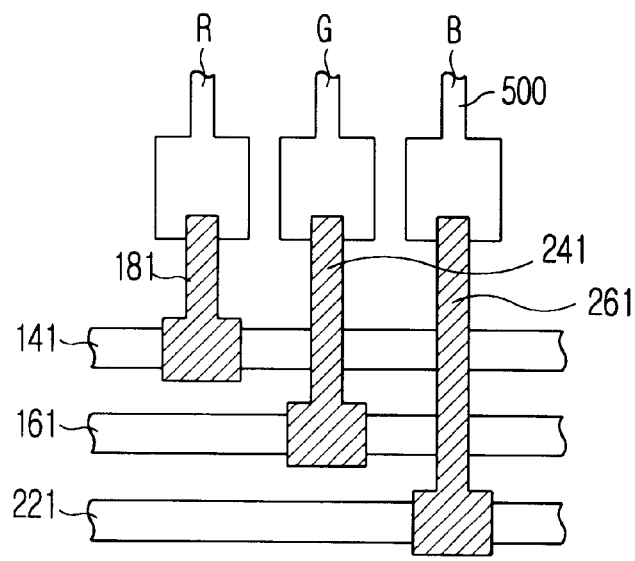
FIG. 8 is an enlarged plan layout view of region VIII in FIG. 6, which illustrates a plurality of data line extensions which overlap respective data lines and sub-repair lines.

Referring now to FIGS. 6–8, a plan layout view of a flat panel color display according to a second embodiment of the present invention will be described. Highlighted regions VII and VIII in FIG. 6 are provided as enlarged views in FIGS. 7–8. The embodiment of FIGS. 6–8 is similar to the first embodiment of FIGS. 3–5, as evidenced by the same reference numerals, however, the display comprises a color display having red, green and blue pixels arranged as a plurality of interleaved arrays of color pixels and each of the arrays comprises a plurality of columns of pixels of the same color. As illustrated, the data pads 900 are arranged in a red, green and blue sequence, as denoted by the labels "R", "G" and "B". Main repair lines for the data lines coupled to the red, green and blue columns of pixels are provided by a "red" main repair line 111, a "green" main repair line 121 and a "blue" main repair line 201. A plurality of "red" sub-repair lines 141, a plurality of "green" sub-repair lines 161 and a plurality of "blue" sub-repair lines 221 are also provided. The greater the number of main repair lines and sub-repair lines of each color, the greater the number of data lines which can be repaired. Similarly, "red" data line extensions 181, "green" data line extensions 241 and "blue" data line extensions 261 are provided. As illustrated, the "blue" data line extensions 261 overlap the "red", "green" and "blue" sub-repair lines 141, 161 and 221, the "green" data line extensions 241 overlap the "red" and "green" sub-repair lines 141 and 161 and the "red" data line extensions 181 overlap the "red" sub-repair lines 141.

Based on these above-described embodiments, a comparison of parasitic capacitance will be performed to illustrate advantages of the present invention over the prior art. With respect to the embodiment of FIG. 3, the total capacitance generated at the 1536th data line 500 (located at the center of the display area "A") may be calculated as follows. The main overlapping points refer to the following overlapping points of lines: the even main repair line 120 and the even data lines 500, the odd main repair line 110 and the odd data lines 500, the even main repair line 120 and the even sub-repair lines 160, the odd main repair line 110 and the odd sub-repair lines 140, the even sub-repair lines 160 and the even data line extensions 180, the odd sub-repair lines 140 and the odd data line extensions 180, the even data line extensions 180 and the opened even data line 500, and the odd data line extensions 180 and the opened odd data lines 500. The primary overlapping points are made larger than other parts for ease of repair, and the capacitance resulting from each of these points is denoted by the capacitance C. The secondary overlapping points refer to the following overlapping the even main repair line 120 and the odd data lines 500, the odd main repair line 110 and the even data lines 500, the even main repair line 120 and the odd sub-repair lines 140, and the odd main repair line 110 and the even sub-repair lines 160. The crossing points here are made narrower than other parts in order to minimize the parasitic capacitance. The capacitance resulting from each of these points is denoted by the capacitance C/3.

Figure 1:
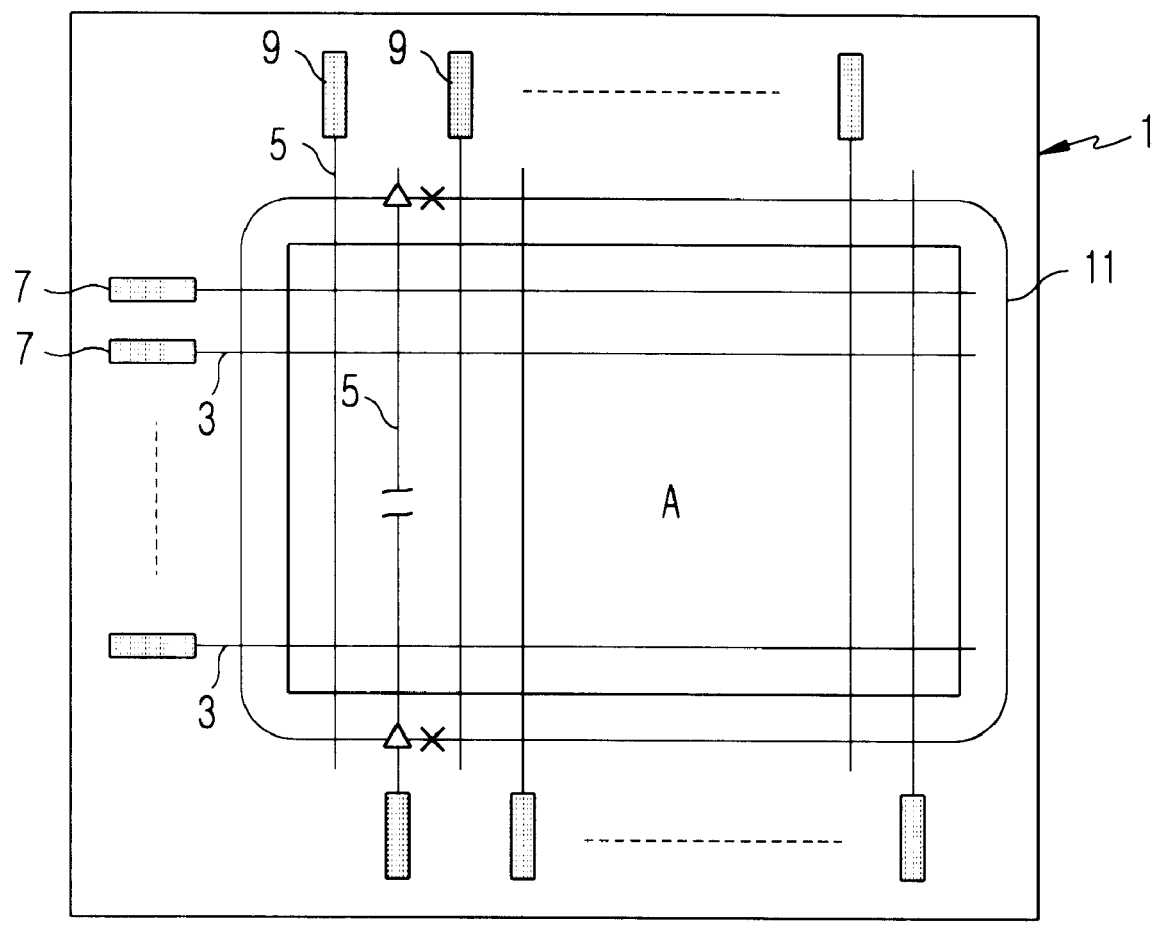
FIGS. 1–2 are plan layout views of flat panel display devices according to the prior art.
Figure 2:
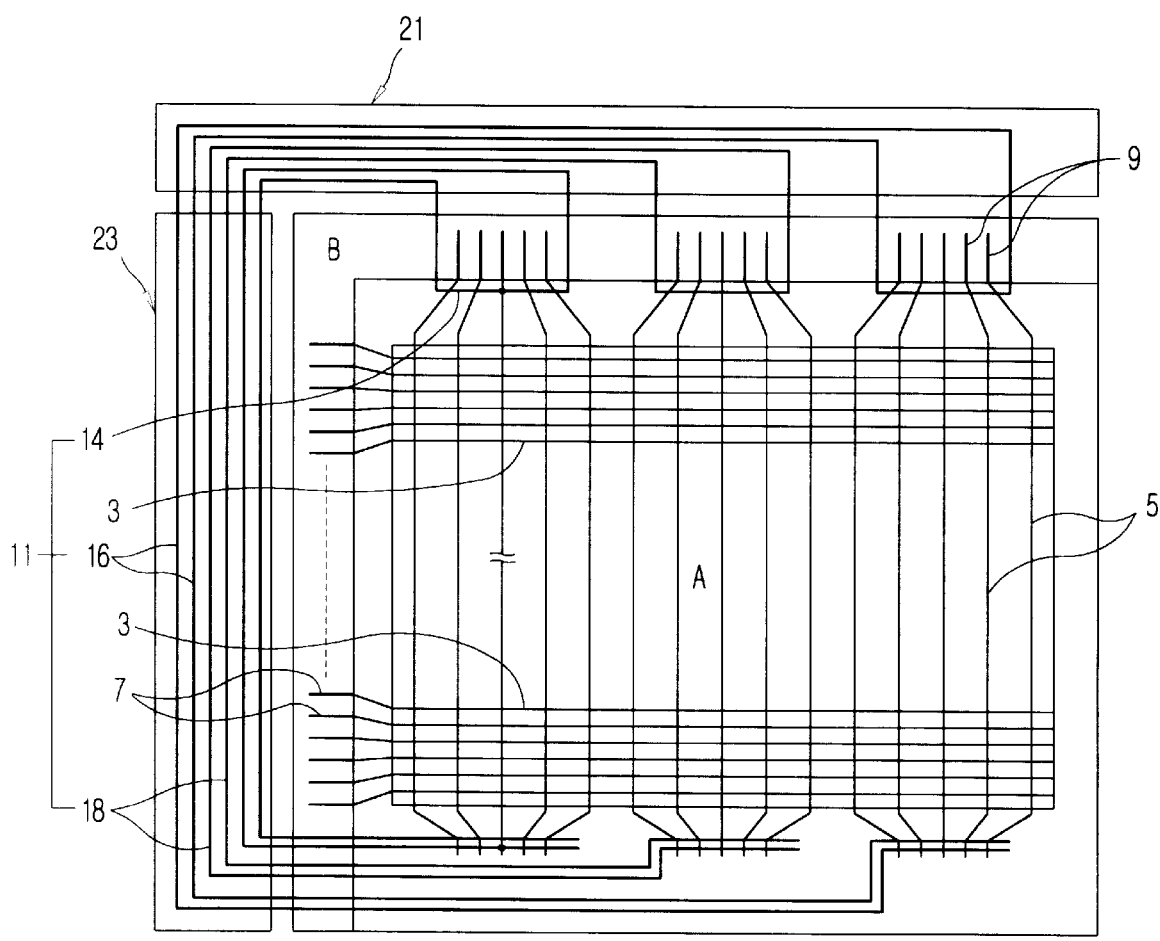

In the upper portion of the substrate B, the parasitic capacitance generated by the secondary overlapping points resulting between the odd data lines 500 and the even main repair line 120 is given as C/3*1536*½=256C, and the parasitic capacitance generated by the primary overlapping points resulting between the even data lines 500 and the even main repair line 120 is given as C*1536*½=768C. In the lower portion of the substrate B, the open at the 1536th data line 500 can be repaired through the fifth even sub-repair line 160, which corresponds to the fifth block of data lines 500. Therefore, since there are two primary overlapping points and two secondary overlapping points for each pair of the sub-repair lines, there are ten primary overlapping points resulting from the overlap between the even sub-repair lines 160 and the even main repair line 120, resulting in 10*C, and ten secondary overlapping points resulting from the overlap between the even main repair line 120 and the odd sub-repair lines 140, resulting in 10*C/3=3.3C. Next, assuming that the open at the 1536th data line 500 is located in the center area adjacent to the sub-repair lines 140, 160, the parasitic capacitance results from only 154 of the total of 309 data line extensions 180 in the fifth block since the other half of the data line extensions 180 are opened. The number of even data line extensions 180 overlapping the even sub-repair lines 160 is 77. Each of these even data line extensions 180 has two primary overlapping points from overlapping the even sub-repair line 160 and the even data line 500, generating 2C, and a secondary overlapping point from overlap with a corresponding odd sub-repair line 180. Thus, the parasitic capacitance resulting from the 154 data line extensions 180 is C/5*77=15.4C, where the value C/5 is the sum of 2C and C/3 in series. Accordingly, the total parasitic capacitance generated at the 1536th data line 500 is only 1052.7C (1024C+10C+3.3C+15.4C), which is significantly lower than 3072C for the prior art device of FIG. 1.

Now, with respect to the embodiment of FIG. 6, suppose that the 1534th data line 500, which is a red "R" data line, is opened. The parasitic capacitance generated to repair the 1534th data line 500 according to the above embodiment of the present invention may be calculated as follows. As in the previous embodiment, the capacitance generated by the main repair point and the crossing point are assumed to be C and C/3, respectively. In the upper portion of the substrate "B", there are about 511 main repair points (1534*⅓) and about 1023 crossing points (1534*⅔) resulting from overlap between the R main repair line 111 and 1534 R, G, and B data lines 500. Therefore, the total parasitic capacitance in the upper portion B of the substrate may be about 852C (511C+1023*C/3).

In the lower portion of the substrate, the 1534th data line 500 (an R data line 500) may be repaired through the fifth R sub-repair line 141 and since each R sub-repair line 141 forms two primary points by overlapping the R main repair line 111, ten primary points are formed (10C). For the fifth R sub-repair line 141, four secondary points are formed by overlapping the G and B main repair lines 121 and 201, resulting in 4*⅓C=1.3C. Next, assuming that the 1534th data line 500 is located in the center, in areas adjacent to the R, G, and B sub-repair lines 141, 161, and 221, parasitic capacitance may result from only about half (say 154) of the R, G, and B data lines 500 and the R, G, and B data line extensions 181, 241, and 261 since the other half are opened. Of these, only the R sub-repair lines 141 and the R data line extensions 181 are involved; thus, the lines involved are one third of the 154 lines. Each R data line extension 181 being used generates capacitance C on each of its ends, forming two capacitor in series, resulting in C/2. Therefore, the parasitic capacitance generated with respect to the R data line extension 181 is C/2*154*⅓=25.6C.

With respect to parasitic capacitance generated by the G and B data line extensions 241, 261, each has a primary point and a secondary point which are in series, resulting in C/4. The primary point is formed by overlapping the G data line extension 241 (B data line extension 261) on the G data line 500 (B data line 500), and the secondary point is formed by overlapping the G data line extension 241 (B data line extension 261) on the R sub-repair line 141. The number of G and B data line extensions 181, 241 under consideration is 154*⅔. Therefore, the parasitic capacitance generated is C/4*154*⅔=25.7C. Thus, the total parasitic capacitance generated as a result of repairing the opened 1534th data line is only about (341+511.3+11.6+25.6+25.6)C=915C. Accordingly, the use of sub-repair lines and data line extensions in accordance with the present invention can improve the display's built-in repair capability.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A display device, comprising:

a substrate having first and second opposing sides;

a plurality of first signal lines on said substrate;

a first repair line on said substrate, said first repair line extending along the first and second sides and opposite said plurality of first signal lines at a location adjacent the first side;

a first sub-repair line on said substrate, said first sub-repair line extending opposite said first repair line at a location adjacent the second side; and a first signal line extension on said substrate, said first signal line extension extending opposite one of said plurality of first signal lines and extending opposite said first sub-repair line.

2. The display device of claim 1, wherein said first repair line and said first signal line extension are established at a first wiring level on said substrate; wherein said plurality of first signal lines and said first sub-repair line are established at a second wiring level on said substrate; and wherein the second wiring level overlaps or underlies the first wiring level.

3. The display device of claim 2, further comprising a plurality of second signal lines on said substrate; wherein said plurality of first signal lines and said plurality of second signal lines extend in first and second orthogonal directions across said substrate, respectively; and wherein said plurality of second signal lines, said first repair line and said first signal line extension are established at the first wiring level.

4. The display device of claim 2, wherein said one of said plurality of first signal lines has a break therein at a location intermediate first and second ends thereof; wherein said first signal line extension is electrically connected to the second end of said one of said plurality of first signal lines and said first sub-repair line by first and second connections, respectively; wherein said first sub-repair line is electrically connected to said first repair line by a third connection; and wherein said first repair line is electrically connected to the first end of said one of said plurality of first signal lines by a fourth connection.

5. The display device of claim 2, further comprising a second repair line on said substrate, said second repair line extending along the first and second sides and opposite said plurality of first signal lines at a location adjacent the first side; and wherein said first sub-repair line extends opposite said second repair line at a location adjacent the second side.

6. The display device of claim 5, further comprising a second sub-repair line on said substrate, said second sub-repair line extending opposite said second repair line.

7. The display device of claim 6, wherein said second sub-repair line does not extend opposite said first repair line.

8. The display device of claim 6, further comprising a second signal line extension extending opposite another of said plurality of first signal lines and extending opposite said second sub-repair line.

9. The display device of claim 8, wherein said second signal line extension extends opposite said first sub-repair line.

10. The display device of claim 9, wherein the display device comprises a liquid crystal display (LCD) device; and wherein said first and second plurality of signal lines comprise data lines and gate lines of the LCD device, respectively.

11. A flat panel display device, comprising:
    a substrate having first and second opposing sides and an array of pixels therein which define an active display area extending between the first and second sides;
    a plurality of data lines extending across the array of pixels in a first direction, from the first side towards the second side;
    a plurality of gate lines extending across the array of pixels in a second direction, orthogonal to the first direction;
    a first repair line on said substrate, said first repair line extending along the first and second sides and opposite said plurality of data lines at a location adjacent the first side;
    a first sub-repair line on said substrate, said first sub-repair line extending opposite said first repair line at a location adjacent the second side; and
    a first data line extension on said substrate, said data line extension extending opposite one of said plurality of data lines and extending opposite said first sub-repair line.

12. The display device of claim 11, wherein said first repair line and said first data line extension are established at a first wiring level on said substrate; wherein said plurality of data lines and said first sub-repair line are established at a second wiring level on said substrate; and wherein the second wiring level overlaps or underlies the first wiring level.

13. The display device of claim 11, wherein said plurality of gate lines, said first repair line and said first data line extension are established at the first wiring level.

14. The display device of claim 13, wherein said one of said plurality of data lines has a break therein at a location intermediate first and second ends thereof; wherein said first data line extension is electrically connected to the second end of said one of said plurality of data lines and said first sub-repair line by first and second connections, respectively; wherein said first sub-repair line is electrically connected to said first repair line by a third connection; and wherein said first repair line is electrically connected to the first end of said one of said plurality of data lines by a fourth connection.

15. The display device of claim 13, further comprising a second repair line on said substrate, said second repair line extending along the first and second sides and opposite said plurality of first data lines at a location adjacent the first side; and wherein said first sub-repair line extends opposite said second repair line at a location adjacent the second side.

16. The display device of claim 15, further comprising a second sub-repair line on said substrate, said second sub-repair line extending opposite said second repair line.

17. The display device of claim 16, wherein said second sub-repair line does not extend opposite said first repair line.

18. The display device of claim 16, further comprising a second data line extension extending opposite another of said plurality of data lines and extending opposite said second sub-repair line.

19. The display device of claim 18, wherein said second data line extension extends opposite said first sub-repair line.

20. A flat panel display device, comprising:
    a substrate having first and second opposing sides and a first and second interleaved arrays of first and second color pixels, respectively, which define an active display area extending between the first and second sides;
    a plurality of first data lines extending across the first color pixels in the first array thereof, from the first side towards the second side;
    a plurality of second data lines extending across the second color pixels in the second array thereof, from the first side towards the second side;
    a first color repair line on said substrate, said first color repair line extending along the first and second sides and opposite said plurality of first data lines at a location adjacent the first side;
    a first color sub-repair line on said substrate, said first color sub-repair line extending opposite said first color repair line at a location adjacent the second side;
    a first color data line extension on said substrate, said first color data line extension extending opposite one of said plurality of first data lines and extending opposite said first color sub-repair line;
    a second color repair line on said substrate, said second color repair line extending along the first and second sides and opposite said plurality of second data lines at a location adjacent the first side;
    a second color sub-repair line on said substrate, said second color sub-repair line extending opposite said second color repair line at a location adjacent the second side; and a second color data line extension on said substrate, said second color data line extension extending opposite one of said plurality of second data lines and extending opposite said second color sub-repair line.

21. A flat panel display device, comprising:

a substrate having first and second interleaved arrays of first and second color pixels therein, respectively, which define an active display area;

a plurality of gate lines at a first wiring level extending across the active display area;

a plurality of first data lines at a second wiring level extending across the active display area, said plurality of first data lines including a defective first data line therein;

a first color repair line at the first wiring level, said first color repair line electrically connected to a first end of the defective first data line;

a first color sub-repair line at the second wiring level, said first color sub-repair line electrically connected to said first color repair line; and a first color data line extension at the first wiring level, said first color data line extension electrically connected to said first color sub-repair line and a second end of the defective first data line.

22. The display device of claim 21, wherein the first and second color pixels in the first and second arrays thereof comprise thin-film transistors; wherein said gate lines are electrically connected to gate electrodes of the thin-film transistors; wherein the first data lines and said first color data line extension extend in a first direction across the substrate; and wherein said gate lines extend in a second direction across the substrate which is orthogonal to the first direction.

23. The display device of claim 22, further comprising:

a plurality of second data lines at the second wiring level extending across the active display area, said plurality of second data lines including a defective second data line therein;

a second color repair line at the first wiring level, said second color repair line electrically connected to a first end of the defective second data line;

a second color sub-repair line at the second wiring level, said second color sub-repair line electrically connected to said second color repair line; and a second color data line extension at the first wiring level, said second color data line extension electrically connected to said second color sub-repair line and a second end of the defective second data line.

24. The display device of claim 23, wherein said plurality of first and second data lines extend across the first color pixels in the first array thereof and across the second color pixels in the second array thereof, respectively; wherein said first color sub-repair line overlaps or underlies said second color repair line; and wherein said second color data line extension overlaps or underlies said first color sub-repair line.

* * * * *